United States Patent [19]

Hunt

[11] Patent Number: 4,630,168

[45] Date of Patent: Dec. 16, 1986

[54] LIGHTNING PROTECTION FASTENER

[75] Inventor: James Hunt, Renton, Wash.

[73] Assignee: The Boeing Company, Seattle, Wash.

[21] Appl. No.: 809,930

[22] Filed: Dec. 16, 1985

[51] Int. Cl.⁴ .............................................. H05F 1/02
[52] U.S. Cl. ................................... 361/218; 244/1 A; 411/373
[58] Field of Search ....................... 361/212, 218, 220; 244/1 A; 411/373

[56] References Cited

U.S. PATENT DOCUMENTS

| | | | |
|---|---|---|---|
| 2,253,264 | 8/1941 | Burleson | 174/12 |
| 3,122,051 | 2/1964 | Greene | 411/373 |
| 3,425,313 | 2/1969 | Villo | 85/53 |
| 3,470,787 | 10/1969 | Mackie | 85/53 |
| 3,494,243 | 2/1970 | Kleinhenn | 85/1 |
| 3,557,654 | 1/1971 | Weidner, Jr. | 85/9 |
| 3,592,100 | 7/1971 | Mackiewicz et al. | 85/1 |
| 3,618,444 | 11/1971 | Kay et al. | 85/9 |
| 3,620,119 | 11/1971 | King, Jr. et al. | 85/1 |
| 3,693,495 | 9/1972 | Wagner | 85/9 |
| 3,885,492 | 5/1975 | Gutshall | 85/53 |
| 3,897,712 | 8/1975 | Black | 85/9 |
| 3,906,308 | 9/1975 | Amason et al. | 317/2 |
| 3,989,984 | 11/1976 | Amason et al. | 317/2 |
| 4,154,138 | 5/1979 | Melone | 85/9 |
| 4,316,690 | 2/1982 | Voller | 411/377 |
| 4,373,842 | 2/1983 | Bettini et al. | 411/377 |
| 4,382,049 | 5/1983 | Hofmeister et al. | 264/40.1 |
| 4,502,092 | 2/1985 | Bannink, Jr. et al. | 361/218 |

FOREIGN PATENT DOCUMENTS 797581  7/1958  United Kingdom ................. 411/373

Primary Examiner—L. T. Hix
Assistant Examiner—Douglas S. Lee
Attorney, Agent, or Firm—Joan H. Pauly

[57] ABSTRACT

A fastener (36,58) attaches a composite material external skin (2) of an aircraft structure to another structure (4). Fastener (36,58) has a metallic head (44,62) and shaft (38,60) and a dielectric cap (50,70) covering a top portion of head (44,62). Head (44,62) and cap (50,70) are received into a countersink hole (6) in skin (2). Cap (50,70) is resilient and fills gap (16) between the top portion of head (44,62) and the inner sidewalls of hole (6). Cap (50,70) forms, with skin (2), an aerodynamic surface which is sufficiently continuous to receive and maintain a crack-free coat of paint having a uniform thickness. The top (52) of cap (50) of internally wrenching fastener (36) is an integral layer of uniform thickness. The top (72) of cap (70) of fastener (58) includes a uniform layer covering the head's top surface around a tool receiving recess (66) and a body of material (74) filling recess (66) and positioned therein after structures (2,4) are attached.

8 Claims, 11 Drawing Figures

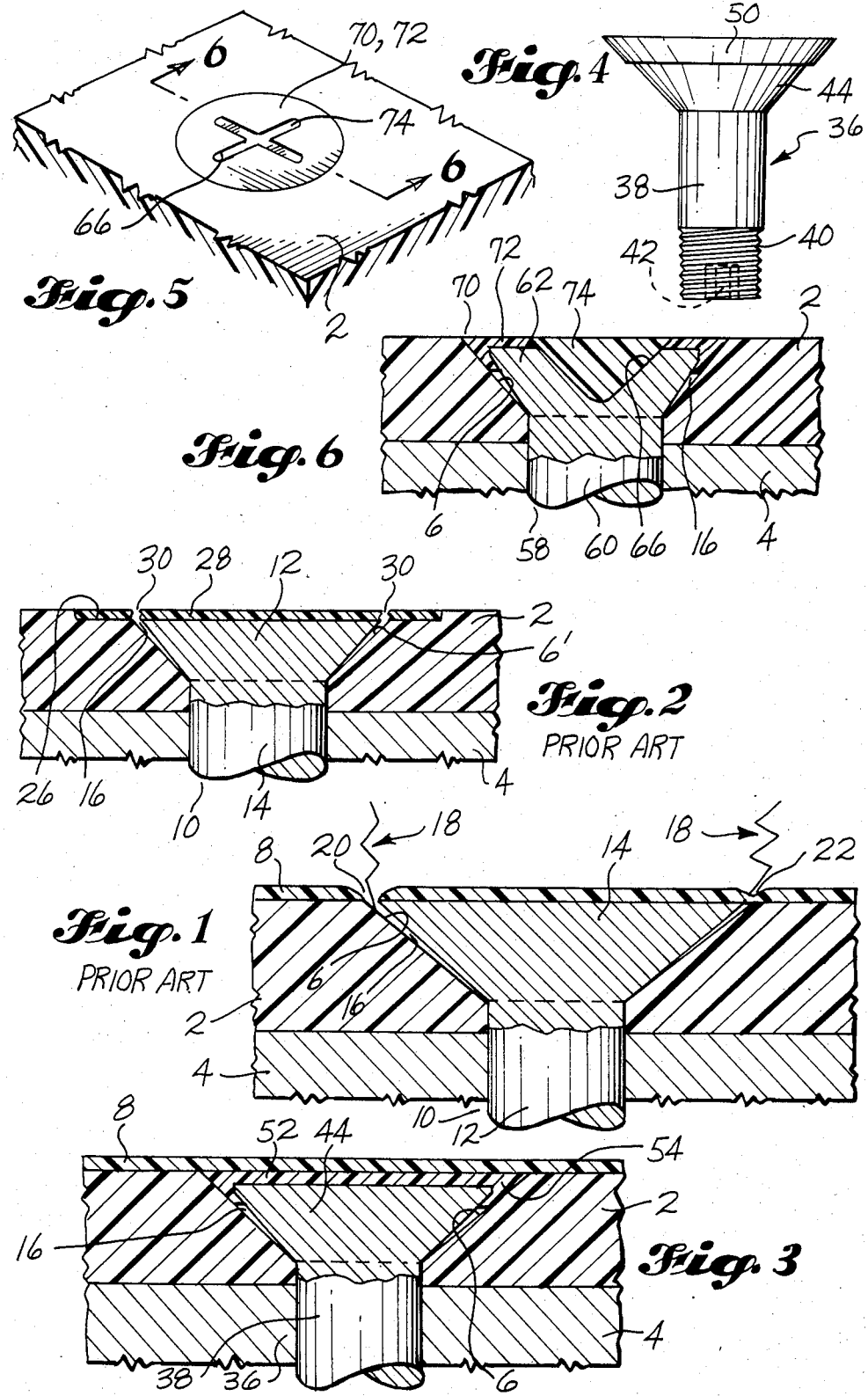

LIGHTNING PROTECTION FASTENER

TECHNICAL FIELD

This invention relates to lightning protection systems for aircraft and, more particularly, to a metallic fastener having a dielectric cap which has sufficient resilience and is dimensioned to fill a gap between the fastener head and a counterbore in which the fastener is installed, to provide a continuous flush surface for receiving a crack free coat of paint.

BACKGROUND ART

In the manufacture of aircraft structures, composite materials, such as graphite fiber reinforced epoxy resins, are being used increasingly in place of metals such as aluminum. One of the major advantages of the use of the composite materials is that they make it possible to significantly reduce the weight of the aircraft structure and, therefore, result in a more fuel efficient aircraft. The potential increase in fuel economy makes it desirable to maximize the use of composite materials in the manufacture of commercial aircraft. One type of structure that may be at least partially fabricated from composite materials is a wing box structure which has an outside skin that forms a portion of the wing skin and internal portions defining a wing fuel tank. The wing box is normally attached to the rest of the wing structure by means of fasteners of the type having a shaft and a head which is countersunk into the outer surface of the structure. Such fasteners are generally made from metal in order to provide a sufficient amount of structural strength.

The use of metallic fasteners to secure composite material structures like wing boxes presents a serious problem in that the difference in electrical conductivity between the composite material and the fastener causes lightning to be attracted to the fastener. When a lightning strike attaches to the fastener head, the fastener can conduct current into the interior of the wing box and cause internal arcing or sparks inside the wing fuel tank. The presence of fuel vapors in the tank makes such arcing and sparking highly dangerous. Therefore, it is necessary to provide some means of preventing or minimizing the chance of a lightning strike attaching to the fastener.

Another problem associated with the use of countersink fasteners is that a normal countersink fastener installation results in a slight gap between the fastener head and the portion of the aircraft structure forming the internal walls of the countersink bore. This gap is caused by manufacturing tolerances. The gap is another cause of lightning strike attachment to a metallic fastener securing composite material structures and also can cause lightning strike attachment to a metallic fastener even when the structure being fastened is aluminum. In either case, the attachment is caused by a difference in electrical properties between the area at the outer edge of the fastener head and the remainder of the structure.

After the structure is attached by means of the appropriate number of fasteners, a coat of paint normally is applied over the outer surfaces of the fastener heads and the surrounding structure. The gap between a fastener head and its counterbore causes the paint to thin or crack around the outer edge of the fastener head. This thinning or cracking of the paint in turn causes a difference in electrical conductivity, which causes electrical streamers to form around the edges of the fastener heads. These streamers create an electrical field and increase the chance of a lightning strike hitting a fastener head.

There have been a number of proposals for providing protection against lightning strikes attaching to metallic fasteners in a composite material aircraft structure. One type of proposal is the use of plastic fasteners. This approach can be effective in the limited situations in which plastic fasteners have sufficient strength, but in most situations the structural requirements of the aircraft necessitate the use of fasteners that are at least partially metallic. Other solutions that have been suggested include the use of dielectric tape or tank sealant to cover the fastener heads. This kind of approach has failed to produce reliable protection against lightning strikes and has proved to be quite costly.

The patent literature includes a number of examples of systems that have been proposed for protecting a composite material aircraft structure from lightning. U.S. Pat. No. 3,906,308, granted Sept. 16, 1975, to Amason et al., discloses a system in which a dielectric coating is placed over critical components of the structure and, for large span components, spaced metallic strips are affixed to the dielectric outer surface to provide dwell points for the lightning current channel. U.S. Pat. No. 3,989,984, granted Nov. 2, 1976, to Amason et al., discloses an outer grounded perforated metal layer on the aircraft structure with a bonded dielectric layer beneath the metal layer. At joints in the skin of the structure, exterior surfaces of metallic fasteners are exposed and the conductivity of the fasteners is enhanced by providing the fasteners with suitable coatings. U.S. Pat. No. 4,382,049, granted May 3, 1983, to Hofmeister et al., discloses a dielectric "barrier" around the dome portion of a dome nut fastener that projects from the outside skin of an aircraft structure. The barrier is formed after the fastener is in place by molding a layer of dielectric material around the fastener dome. The molding process includes the use of a cap which forms a cavity around the fastener dome to control the thickness of the dielectric barrier.

U.S. Pat. No. 3,592,100, granted July 13, 1971, to Mackiewicz et al., discloses a screw designed for use with grouped electrical switches to prevent arcing between adjacent screw heads. The screw has an exposed metal shank and threaded portion and an insulated head with a slot therethrough which exposes the base metal.

The patent literature also includes a number of examples of plastic or other corrosion resistant caps for fasteners. U.S. Pat. No. 3,425,313, granted Feb. 4, 1969, to J. P. Villo, discloses such a cap for countersink socket head screws. The cap includes an annular skirt portion and a circular top, and is placed in position over the screw head after the screw head has been positioned in a counterbore. The cap is forced into position, such as by a hammer blow. The cap is provided with some resiliency so that it will prevent loosening of the screw by vibrations and seal the counterbore against water and other contaminants. The top of the cap is flush with the surrounding surface when the cap is installed. The socket in the head of the screw remains unfilled but is covered by a portion of the top of the cap that may be broken away to insert a wrench and remove the screw.

U.S. Pat. No. 3,494,243, granted Feb. 10, 1970, to W. H. Kleinhenn, discloses a self-sealing screw with a coating of a material such as Teflon (trademark) on the underside of the head and sometimes also on the shank and threads. U.S. Pat. No. 3,620,119, granted Nov. 16, 1971, to King, Jr., et al., discloses a method and apparatus for making a fastener with an anticorrosive material on the underside of the head and the unthreaded shank portion and, apparently, sometimes on the top of the head.

Corrosion resistant caps for fasteners of a type having a protruding head are disclosed in U.S. Pat. Nos. 3,470,787, granted Oct. 7, 1969, to W. L. Mackie; 3,557,654, granted Jan. 26, 1971, to H. C. Weidner, Jr.; 3,618,444, granted Nov. 9, 1971, to W. Kay et al.; 3,693,495, granted Sept. 26, 1972, to D. P. Wagner; 3,885,492, granted May 27, 1975, to C. E. Gutshall; 3,897,712, granted Aug. 5, 1975, to D. A. Black; 4,154,138, granted May 15, 1979, to R. R. Melone; 4,316,690, granted Feb. 23, 1982, to R. L. Voller; and 4,373,842, granted Feb. 15, 1983, to J. E. Bettini et al. W. H. Burleson discloses, in U.S. Pat. No. 2,253,264, granted Aug. 19, 1941, a tubular post-type electric insulator filled with a dielectric liquid and having ends capped with metal and a dielectric.

The known proposals and patents discussed above and the prior art that is discussed and/or cited in the patents should be studied for the purpose of putting the present invention into proper perspective relative to the prior art.

DISCLOSURE OF THE INVENTION

A subject of the invention is the combination, in an aircraft, of a first structure with an external skin made from a plastic material, a second structure, and at least one fastener for attaching the first structure to the second structure. The fastener comprises a shaft and a head, each of which is made from a metal that is more electrically conductive than the plastic material and that has sufficient strength to carry loads of a predetermined magnitude. The fastener also includes a cap of dielectric material secured to and covering a top portion of the head to prevent lightning strikes from attaching to the fastener. The external skin of the first structure has a countersink hole therein for receiving the head and the cap of the fastener. The cap is shaped and dimensioned and has sufficient resilience to essentially fill gaps between the top portion of the head and inner sidewall portions of the countersink hole, and to form, along with the external surface of the external skin, an aerodynamic surface which is sufficiently continuous to receive and maintain a crack-free coat of paint having a uniform thickness.

The combination of features of the apparatus of the invention solves the problems discussed above in relation to the use of plastic materials, such as graphite fiber reinforced epoxy resin composite materials, in aircraft structural components that must be attached by metallic fasteners in order to meet the structural strength requirements of the aircraft. The provision of a dielectric cap to cover the top portion of the head of such a fastener, and the provision of such cap with characteristics that cause it to fill gaps between the top portion of the fastener head and inner sidewall portions of the countersink hole into which the head and the cap are received effectively protect the structure and surrounding structures from internal arcing and sparking caused by lightning strikes attaching to the fastener. The shaping and dimensioning of the cap to form an aerodynamic surface with the external surface of the structure provides the additional benefit of improving the aerodynamic efficiency of the structure. The filling of the gaps between the fastener head and the sidewalls of the countersink hole, in combination with the forming of an aerodynamic surface which is sufficiently continuous to receive and maintain a crack-free coat of paint having a uniform thickness, eliminates the problems of such gaps or the thinning or cracking of paint causing differences in electrical properties which attract lightning strikes to the fastener. The overall combination of the apparatus of the invention provides reliable and effective protection against lightning strikes that is relatively inexpensive and easy to install and maintain and, thus, makes it possible to maximize fuel economy by maximizing use of lightweight composite materials.

A preferred feature of the invention is a cap which has a top portion that covers the top of the head of the fastener to form a part of the aerodynamic surface, and an annular side portion that covers side portions of the head and extends inwardly into the countersink hole from the top portion of the cap. This arrangement ensures that any portion of the fastener which is exposed to the outside environment is protected by a dielectric material and that the upper portions of the gaps are effectively filled to eliminate the undesirable electrical properties of the gaps. The arrangement permits the cap to extend only partway down the side surfaces of the head and only partially into the countersink hole. This in turn helps to reduce the cost of the fastener and to insure easy installation of the fastener.

In the combination of the invention, the fastener may have either an axial tool receiving recess in the end of its shaft opposite its head, or a tool receiving recess in the top surface of its head. In the former case, preferably, the top surface of the head substantially conforms to the aerodynamic surface, and the cap includes a continuous integral layer of dielectric material that covers the top surface of the head and has an essentially uniform thickness to form a part of the aerodynamic surface. This arrangement helps to minimize the cost of manufacturing the fastener, to maximize the smoothness and conformity of the aerodynamic surface, and to ensure that there are no voids or pits in the top portion of the cap which could affect its electrical properties.

In the latter case, the cap preferably includes a layer of dielectric material of essentially uniform thickness covering the top surface of the head and surrounding the recess in such top surface, and a body of dielectric material that is shaped to fill the recess and to form, along with the layer, a part of the aerodynamic surface. This body of dielectric material is positioned in the recess after the fastener has been positioned to attach the structures. This arrangement has the advantage of providing effective protection against lightning strike attachment in situations in which it is impractical or impossible to use an internally wrenched fastener; i.e., a fastener having a tool receiving recess in the end of its shaft. The provision of the body of dielectric material ensures that there is lightning protection over the entire top portion of the fastener and also improves the aerodynamic efficiency of the structure. The positioning of such body after the structures are attached allows easy installation of the fastener. The dielectric material that fills the recess is relatively thick since it extends all the way into the recess, and the body of dielectric material does not have to bridge any interface between the fastener and the structure. Thus, the body of dielectric material, along with the layer of dielectric material, forms a continuous protective cap over the fastener that is not subject to cracking.

Another subject of the invention is a method of attaching an aircraft structure with an external skin of a plastic material to another aircraft structure, and of preventing lightning strikes from causing internal sparking or arcing in the structures. According to an aspect of the invention, the method comprises providing a fastener having a shaft and a head, each of which is made from a metal that is more electrically conductive than the plastic material and that has sufficient strength to carry loads of a predetermined magnitude, and a resilient cap of dielectric material secured to and covering a top portion of the head to prevent lightning strikes from attaching to the fastener. The method also includes forming a countersink hole in the external skin, and positioning the fastener to attach the structures together. The positioning of the fastener includes positioning the head and the cap in the countersink hole. While the fastener is being positioned, the cap is allowed to essentially fill gaps between the top portion of the head and inner sidewall portions of the countersink hole. An aerodynamic surface is formed from the cap and external surface portions of the external skin surrounding the hole. The aerodynamic surface is sufficiently continuous to receive and maintain a crack-free coat of paint having a uniform thickness. The method has the advantages discussed above in connection with the apparatus of the invention.

These and other advantages and features will become apparent from the detailed description of the best modes for carrying out the invention that follows.

BRIEF DESCRIPTION OF THE DRAWINGS

In the drawings, like element designations refer to like parts throughout, and:

FIG. 1 is a sectional view of an internally wrenching fastener in a prior art installation.

FIG. 2 is a sectional view of the same type of fastener in another prior art installation.

FIG. 3 is a sectional view of a first preferred embodiment of the apparatus of the invention.

FIG. 4 is an elevational view of the fastener shown in FIG. 3.

FIG. 5 is a pictorial view looking toward the outer surfaces of the first structure and a second preferred embodiment of the fastener of the invention.

FIG. 6 is a sectional view taken along the line 6—6 in FIG. 5.

BEST MODES FOR CARRYING OUT THE INVENTION

Figure 7:
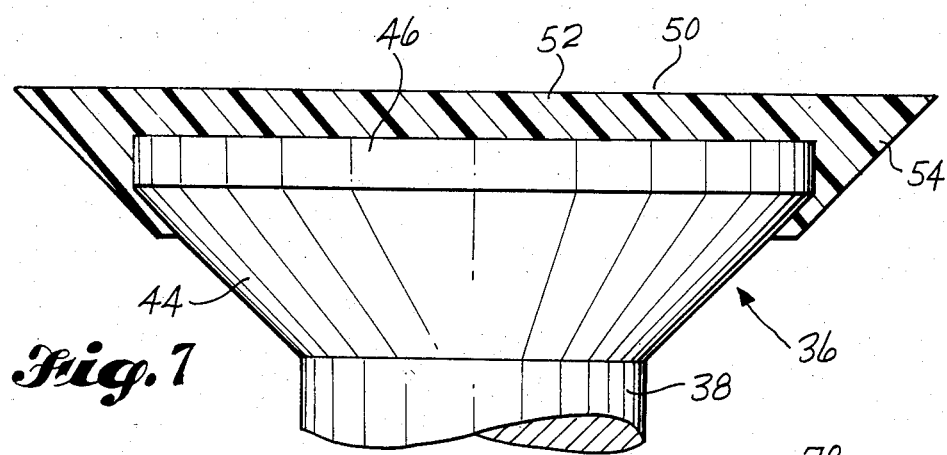
FIG. 7 is an elevational view of the head and part of the shaft of the fastener shown in FIGS. 3 and 4, with the cap shown in section.

The drawings show apparatus that is constructed according to the invention that also constitutes the best modes of the invention currently known to the applicant. The drawings also illustrate the best modes for carrying out the method of the invention currently known to the applicant.

Each of FIGS. 1–3, 5, and 6 illustrates a plastic material external skin portion 2 of a first aircraft structure attached by means of a fastener to a second aircraft structure 4. The plastic material of the external skin 2 would most usually be a graphite fiber reinforced epoxy resin composite material or a similar composite material. However, it is intended to be understood that the term "plastic material", as used herein, includes other plastic materials having strength and weight characteristics appropriate for use in aircraft as well as such composite materials. The second structure 4 might be a flange of an internal supporting structure or some other type of structure, depending on the requirements of the particular installation, and might be made from metal, as shown in the drawings, or any other suitable material.

FIG. 1 shows, for the purpose of comparison, an internally wrenching countersink fastener 10 being used to attach an external skin 2 of composite material to a metal structure 4. The fastener 10 is of a known type and includes a head 12 and a shank 14. The head 12 is received into a countersink hole 6 in the skin 2. A layer of paint 8 has been applied to the external surfaces of skin 2 and head 12. Because of manufacturing tolerances, there is a gap 16 between the fastener head 12 and the inner sidewalls of the countersink hole 6. Reference numeral 18 indicates an electric field created by lightning induced streamers. As discussed above, the formation of the streamers and the electric field is a result of differences in electrical properties in the vicinity of the gap 16 caused by the gap 16 itself and by cracking 20 and thinning 22 of the layer of paint 8 in the area of the gap 16. The situation in FIG. 1 would, of course, be unacceptable in a commercial aircraft in areas where fuel vapors and the like are likely to be present inside the structures 2,4.

FIG. 2 illustrates a modification of the apparatus shown in FIG. 1 that includes previously proposed means for providing protection against lightning strike attachment to the fastener 10. The countersink hole 6' in FIG. 2 has been modified to include a thin annular portion 26 above the frustoconical portion that receives the fastener head 12. After the structures 2,4 have been secured together by the fastener 10, the annular portion 26 is filled with a tank sealant 28. The sealant 28 extends over the top of the fastener 10 and radially outwardly therefrom. The layer of sealant 28 is relatively thin and must bridge the gap 16 between the fastener head 12 and the sidewalls of the hole 6'. These characteristics make the layer of sealant 28 subject to cracking, indicated at reference numeral 30, and thus make the protection provided by the sealant 28 ineffective and unreliable.

In the apparatus combination of the invention, the fastener comprises a shaft and a head similar to the shaft 14 and head 12 of the known fasteners shown in FIGS. 1 and 2, and a cap of dielectric material. The shaft and head are made from a metal that has sufficient strength to carry loads of a predetermined magnitude, which is determined on the basis of the structural requirements of the particular installation. The metal is more electrically conductive than the plastic or composite material which forms the external skin 2 of the first structure being attached by the fastener. The cap is secured to and covers a top portion of the fastener head to prevent lightning strikes from attaching to the fastener. The external skin 2 has a countersink hole 6 therein for receiving the head and the cap of the fastener. The cap is shaped and dimensioned and has sufficient resilience to essentially fill the gap 16 between the top portion of the head and the inner sidewall of the countersink hole 6. The shaping and dimensioning and the resilience of the cap also enable it to form, along with the external surface of skin 2, an aerodynamic surface which is sufficiently continuous to receive and maintain a crack-free coat of paint having a uniform thickness.

FIGS. 3, 4, and 7 illustrate a first preferred embodiment of the fastener of the invention. The fastener 36 is of the internally wrenching type and includes a metal head 44 and a metal shaft 38. The outer end of the shaft 38 opposite the head 44 has threads or lockbolt pull grooves 40 on its circumferential surface and a tool receiving socket or recess 42 extending axially inwardly from its radial end surface. See FIG. 4. The head 44 is generally frustoconical in shape with a cylindrical portion 46 at its top end of relatively small axial dimension. This cylindrical portion 46 is most clearly shown in FIG. 7.

The dielectric cap 50 of the fastener 36 shown in FIGS. 3, 4, and 7 has a top portion 52 which covers the top of the metal head 44, and an annular side portion 54 which covers side portions of the head 44. Preferably, the top portion 52 and the side portion 54 are integrally formed in a single molding operation. The frustoconical side surface of the cap 50 extends inwardly from the top surface into the countersink hole 6 essentially parallel to the sidewalls of the hole 6. The covered side portions of head 44 include the outer circumferential surface of the cylindrical portion 46 and a portion of the frustoconical outer surface adjacent to cylindrical portion 46. The cap 50 extends down the frustoconical surface of the head 44 an amount sufficient to ensure secure attachment between the metal head 44 and the cap 50 and to ensure that the top of the gap 16 is completely filled. The inner radial surface of the cap 50 is substantially parallel to the outer top surface. Some advantages of the configuration of cap 50 are that it is relatively simple and it positively locks onto head 44.

As can be seen in FIGS. 3, 4, and 7, the top surface of the head 44 substantially conforms to the external surface of skin 2. The top portion 52 of the cap 50 is formed by a continuous integral layer of dielectric material that has an essentially uniform thickness. The top or outer surface of cap portion 52 generally conforms to the external surface of skin 2 to form therewith an aerodynamic surface. As can be seen in FIG. 3, the cap 50 effectively fills the upper portion of the gap 16 so that the coat of paint 8 applied over the skin 2 and cap 50 may be made of essentially uniform thickness and be maintained crack-free.

FIGS. 5 and 6 illustrate a second preferred embodiment of the fastener of the invention which is of the externally wrenching type. The fastener 58 has a shaft 60 with threads (not shown) similar to the threads 40 of fastener 36, and a head 62 with a tool receiving recess 66. The recess 66 shown in FIGS. 5 and 6 is designed for receiving a Phillips head screw driver, but it is of course to be understood that other types of recesses, such as an allen wrench recess might also be provided. The cap 70 of fastener 58 is similar to the cap 50 of fastener 36 except that the top portion 72 of the cap 70 is formed differently to accommodate the recess 66 in the head 62. The top portion 72 includes a layer of dielectric material of essentially uniform thickness covering the top surface of the head 62 and surrounding the recess 66. The top portion 72 also includes a body of dielectric material 74 that is shaped to fill the recess 66 and to form, along with the surrounding layer of dielectric material, a part of the aerodynamic surface. This body 74 of dielectric material is positioned in the recess 66 after the fastener 58 has been positioned to attach structures 2,4. The body 74 may be formed by a premolded plastic insert that is shaped and dimensioned to fill the recess 66 and is bonded to the recess with a suitable sealant. Alternatively, the body 74 may be formed by filling the recess 66 with any suitable liquid dielectric filler or sealant and allowing the recess 66 to act as a mold for the filler or sealant.

Each of FIGS. 8-11 shows an alternative embodiment of the fastener of the invention. Each of these fasteners 76,84,95,99 is of the internally wrenching type and, like the fastener 36 shown in FIGS. 3, 4, and 7, has a head 44,86 with a top surface that substantially conforms to the aerodynamic surface and a cap 78,90,96,100 with a top portion formed by a continuous, integral layer of dielectric material of essentially uniform thickness. The side portions 80,92,98,102 of the caps 78,90,96,100, however, have alternative configurations. It is of course to be understood that such alternative configurations and other alternative configurations may also be provided in conjunction with a top portion modified in the manner shown in FIGS. 5 and 6 to accommodate an external tool receiving recess.

Figure 8:
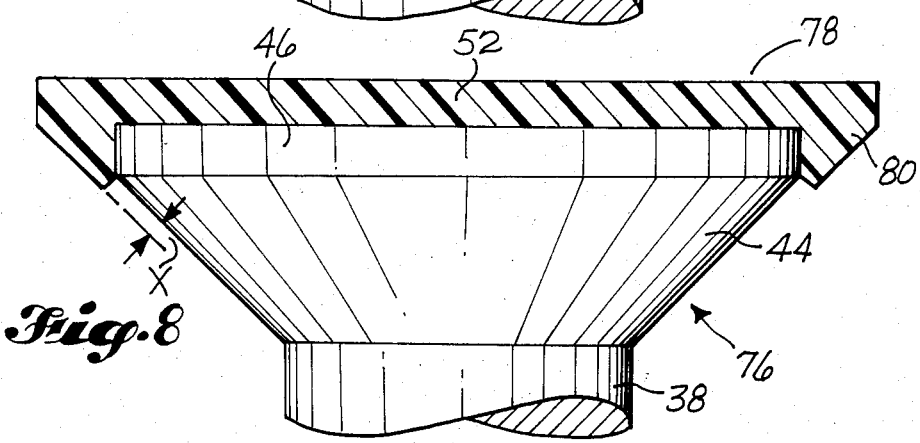
FIGS. 8–11 are similar to FIG. 7, except that they show alternative configurations of the cap of the fastener.
Figure 10:
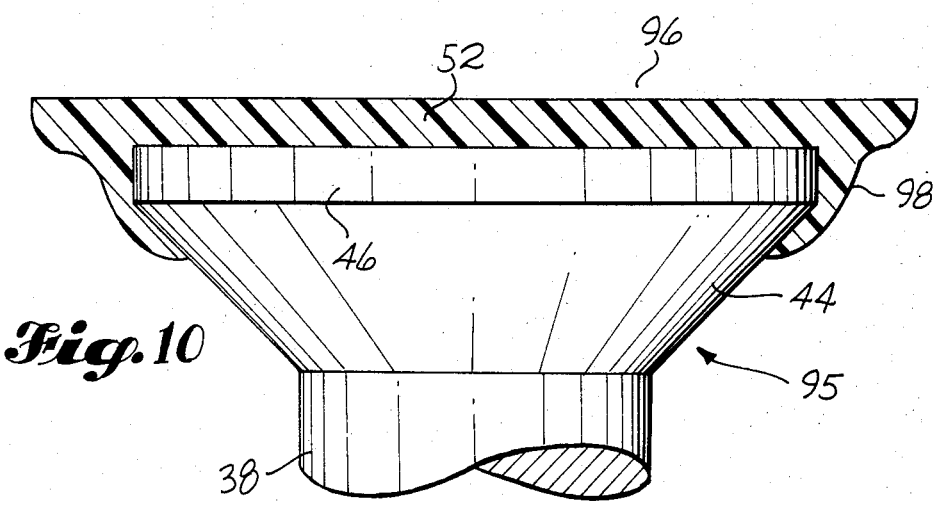
Figure 11:
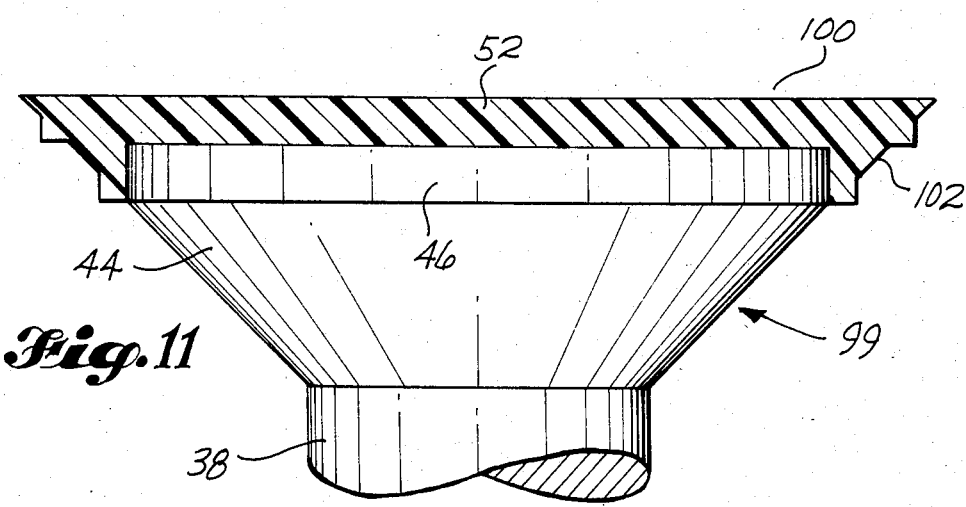

In the fasteners 76,95,99 shown in FIGS. 8, 10, and 11, the head 44 and shaft 38 are the same as the head 44 and shaft 38 of the fastener 36 shown in FIGS. 3, 4, and 7, with the only difference between such fasteners 76,95,99 and fastener 36 being the configuration of the side portion of the dielectric cap. In cap 78 shown in FIG. 8, the outer surface of side portion 80 extends parallel to the axis of the fastener 76 to form a cylindrical portion of such surface, then extends generally parallel to the frustoconical side surface of the head 44, and then extends from the frustoconical portion to the head 44 in a direction generally perpendicular to the frustoconical portion. The length X of the perpendicular surface portion is dimensioned to ensure that the upper portion of the gap 16 is completely filled by the cap 78.

The side portion 98 of the cap 96 shown in FIG. 10 is similar to the side portion 54 of the cap 50 shown in FIGS. 3, 4, and 7, with the major difference being the configuration of the outer surface of the side portion. Such outer surface of side portion 98 curves inwardly, then outwardly, and then inwardly rather than extending in a straight line from the outer top surface of the cap. The side portion 102 of cap 100 shown in FIG. 11 differs from the side portion 54 in that it does not extend inwardly beyond the cylindrical portion 46 of head 44 and that it is formed by a jagged rather than a straight line. The outer side surface of side portion 102 is generally frustoconical with two annular projections thereon of triangular cross-section.

Figure 9:
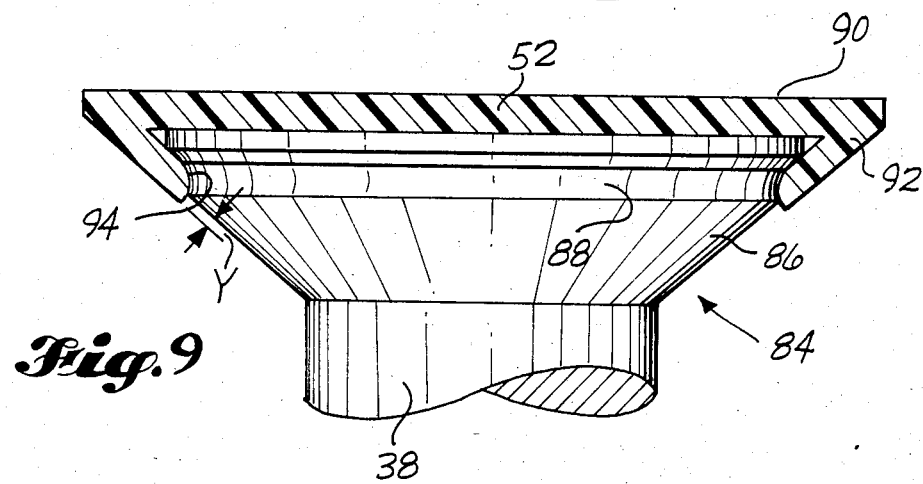

In the fastener 84 shown in FIG. 9, the head 86, as well as the side portion 92 of the cap 90, is modified. At the top of the head 86, there is a thin cylindrical portion, then a bevelled portion, and then an annular curved groove 88. Below the groove 88 is a frustoconical surface that extends down to the shaft 38. The cap 90 has an upper cylindrical portion like the cap 78 shown in FIG. 8 from which it extends inwardly parallel to the frustoconical surface of the head 86. From the inner end of its frustoconical surface, the cap 90 curves inwardly toward the fastener 84 to form a curved portion 94 that mates with the groove 88 on fastener head 86. After curving, the surface of the cap 90 extends parallel to the frustoconical surface to mate with the bevelled portion of the head 86 and extends up to the top portion 52 of the cap 90. The outer frustoconical surface of the cap 90 is spaced a distance Y from the frustoconical surface of the head 86. The distance Y is dimensioned to ensure complete filling of the upper portion of the gap 16. A major advantage of the configuration shown in FIG. 9 is that it provides a positive locking of the cap 90 onto the head 86.

The various configurations of the fastener shown in the drawings and other variations thereof consistent with the scope of the invention, as set forth in the claims, each have their own advantages. Some of these advantages are discussed above. Other advantages will become apparent when further testing of the fastener of the invention is carried out. The choice of what configuration is to be used in a particular situation will depend on the specific requirements of such situation and the particular material used to form the cap. Such material may be of a variety of known types of material, such as epoxy resins, having suitable dielectric, bonding, and molding characteristics.

The method of the invention provides a means of attaching an aircraft structure with an external skin 2 of a plastic material to another aircraft structure 4 and of preventing lightning strikes from causing internal sparking or arcing in the structures 2,4. The carrying out of the method includes providing a fastener of the type described in detail above, and forming a countersink hole 6 in the external skin 2 for receiving the fastener head and dielectric cap. The fastener is positioned to attach the structures 2,4 together. During the attaching of the structures 2,4, the head and cap of the fastener are positioned in the countersink hole 6 and the fastener is turned so that the threads 40 on the fastener engage corresponding threads in the second structure 4 or a nut or collar internal to second structure 4. The turning of the fastener is accomplished by inserting an appropriate tool into the tool receiving recess 42,66 and turning the tool or the nut or collar in the usual manner. The positioning of the fastener automatically causes the cap to essentially fill the gap 16 between the top portion of the fastener head and the sidewalls of the countersink hole 6. The method also includes forming an aerodynamic surface from the cap and external surface portions of the external skin 2 surrounding the hole 6. Since the cap fills the gap 16 and the hole 6 is dimensioned to receive the head and cap of the fastener, the aerodynamic surface is sufficiently continuous to receive and maintain a crank-free coat of paint having a uniform thickness.

In embodiments of the fastener which are internally wrenching, the step of forming the aerodynamic surface is accomplished by positioning the fastener and allowing the cap to fill the gap 16. When the fastener is of the externally wrenching type, preferably the aerodynamic surface is formed by positioning the fastener 58, allowing the cap 70 to fill the gap 16, and filling the tool receiving recess 66 in the top of the head 62 with a dielectric material 74 after the structures 2,4 have been attached by means of the fastener 58. It is anticipated that the primary use for the fasteners of the invention will be to close out a wing box. Since this procedure is normally carried out only once in the lifetime of the aircraft, it is unlikely that the body of dielectric material 74 in recess 66 will ever need to be disturbed. However, if removal of the fastener 58 is for some reason required, the material 74 may be removed mechanically or melted out with a heated screwdriver.

It should be obvious to those skilled in the art to which this invention is addressed that the invention may be used to advantage in a variety of situations and that various modifications and omissions in form and detail may be made without departing from the spirit and scope of the invention as defined in the following claims.

What is claimed is:

1. In an aircraft, the combination of:
    a first structure with an external skin made from a plastic material;
    a second structure; and
    at least one fastener for attaching the first structure to the second structure;
    said fastener comprising a shaft and a head, each of which is made from a metal that is more electrically conductive than said plastic material and that has sufficient strength to carry loads of a predetermined magnitude; and a cap of dielectric material secured to and covering a top portion of the head to prevent lightning strikes from attaching to the fastener;
    said external skin having a countersink hole therein for receiving the head and the cap of the fastener; and
    said cap being shaped and dimensioned and having sufficient resilience to essentially fill gaps between said top portion of the head and inner sidewall portions of the countersink hole, and to form, along with the external surface of said external skin, an aerodynamic surface which is sufficiently continuous to receive and maintain a crack-free coat of paint having a uniform thickness.

2. The combination described in claim 1, in which the cap has a top portion which covers the top of the head to form a part of said aerodynamic surface, and an annular side portion which covers side portions of the head and extends inwardly into the countersink hole from said top portion of the cap.

3. The combination described in claim 2, in which the top surface of the head substantially conforms to said aerodynamic surface, the shaft has an axial tool receiving recess in its end opposite the head, and the top portion of the cap is formed by a continuous, integral layer of dielectric material of essentially uniform thickness.

4. The combination described in claim 2, in which the top surface of the head has a tool receiving recess therein; and the top portion of the cap comprises a layer of dielectric material of essentially uniform thickness covering said top surface and surrounding the recess, and a body of dielectric material that is shaped to fill the recess and to form, along with said layer, said part of said aerodynamic surface, and that is positioned in the recess after the fastener has been positioned to attach said structures.

5. The combination described in claim 1, in which the top surface of the head has a tool receiving recess therein; and the cap includes a layer of dielectric material of essentially uniform thickness covering said top surface and surrounding the recess, and a body of dielectric material that is shaped to fill the recess and to form, along with said layer, a part of said aerodynamic surface, and that is positioned in the recess after the fastener has been positioned to attach said structures.

6. The combination described in claim 1, in which the top surface of the head substantially conforms to said aerodynamic surface, the shaft has an axial tool receiving recess in its end opposite the head, and the cap includes a continuous integral layer of dielectric material that covers the top surface of the head and has an essentially uniform thickness to form a part of said aerodynamic surface.

7. A method of attaching an aircraft structure with an external skin of a plastic material to another aircraft structure, and of preventing lightning strikes from causing internal sparking or arcing in said structures, said method comprising:

providing a fastener having a shaft and a head, each of which is made from a metal that is more electrically conductive than said plastic material and that has sufficient strength to carry loads of a predetermined magnitude; and a resilient cap of dielectric material secured to and covering a top portion of the head to prevent lightning strikes from attaching to the fastener;

forming a countersink hole in said external skin;

positioning said fastener to attach said structures together, including positioning the head and the cap in the countersink hole;

while so positioning the fastener, allowing the cap to essentially fill gaps between said top portion of the head and inner sidewall portions of the countersink hole; and forming, from the cap and external surface portions of said external skin surrounding the hole, an aerodynamic surface which is sufficiently continuous to receive and maintain a crack-free coat of paint having a uniform thickness.

8. A method as described in claim 7, in which the step of forming said aerodynamic surface comprises filling a tool receiving recess in the top of the head with a dielectric material after positioning the fastener to attach said structures together.

* * * * *